United States Patent [19]

Reynolds, III

[11] Patent Number: 4,521,857
[45] Date of Patent: Jun. 4, 1985

[54] AVIATION WEATHER INFORMATION DISSEMINATION SYSTEM

[75] Inventor: Collins J. Reynolds, III, Denver, Colo.

[73] Assignee: Avimage, Inc., Tucson, Ariz.

[21] Appl. No.: 378,615

[22] Filed: May 17, 1982

[51] Int. Cl.³ .............................................. G06F 15/50
[52] U.S. Cl. .................... 364/439; 364/444; 364/420; 343/5 W; 340/825.35; 179/6.08
[58] Field of Search ...................... 364/439, 444, 420; 343/5 SC, 5 MM, 5 W; 340/26, 825.35, 825.33; 179/2 CA, 6.08; 455/9

[56] References Cited

U.S. PATENT DOCUMENTS

| | | | |
|---|---|---|---|
| 3,718,906 | 2/1973 | Lightner | 340/147 R |
| 3,723,655 | 3/1973 | Zucker et al. | 179/2 DP |
| 3,727,186 | 4/1973 | Stephenson, Jr. et al. | 179/2 CA X |
| 3,872,438 | 3/1975 | Cuttill et al. | 340/825.35 X |
| 3,909,818 | 9/1975 | Dalke et al. | 340/324 AD |
| 3,924,111 | 12/1975 | Farris | 364/443 X |
| 3,967,098 | 6/1976 | Harnaget et al. | 364/443 |
| 3,979,057 | 9/1976 | Katz et al. | 364/443 X |
| 3,995,255 | 11/1976 | Cuttill | 340/825.33 X |
| 4,156,912 | 5/1979 | Shigeta et al. | 364/443 |
| 4,163,216 | 7/1979 | Arpino | 340/152 R |
| 4,220,994 | 9/1980 | Hendrickson | 364/444 X |
| 4,253,157 | 2/1981 | Kirschner et al. | 364/900 |
| 4,289,930 | 9/1981 | Connolly et al. | 179/2 TV |
| 4,347,618 | 8/1982 | Kavouras et al. | 364/420 X |
| 4,348,693 | 9/1982 | Cauldwell | 343/5 SC X |

FOREIGN PATENT DOCUMENTS 0010399 4/1980 European Pat. Off. ............ 235/381

Primary Examiner—Gareth D. Shaw
Assistant Examiner—Ronni S. Malamud
Attorney, Agent, or Firm—Fields, Lewis, Pittenger & Rost

[57] ABSTRACT

An aviation weather information dissemination system and method involves regional weather-information accumulating and interpreting stations (12A-O) located throughout a geographic area (10). Each regional weather-information and interpreting station communicates with sources (16, 20 and 24) of current weather information peculiar to widely scattered geographic locations, within the geographic area (10). The system also includes a plurality of terminals which communicate with the regional weather-information accumulating and interpreting stations (12) via telephone lines, with each regional station serving particular terminals (14). The regional stations (12), in response to receiving origin and destination points of flights from said terminals (14), compute tentative flight paths between said origin and destination points and provide weather information to the terminals (14) in particular sequences relative to the origins and destinations.

Upon demand, the regional stations (12) provide to the terminals national weather maps, flight path weather data sequenced relative to origin and destination points, destination point radar scans, and computer calculated flight plans.

6 Claims, 17 Drawing Figures

FIG. 7I
COMPUTER PRINTOUT
OF FLIGHT PLAN

AVIATION WEATHER INFORMATION DISSEMINATION SYSTEM

BACKGROUND OF THE INVENTION

This invention relates generally to the art of compiling, interpreting, and disseminating weather information, and more particularly to a particular weather system for use by aircraft crews in preparing for and during flights.

Prior to takeoff, it is imperative for aircraft crews, particularly pilots, to familiarize themselves with weather conditions which relate to their immediately-planned flights. This, of course, is true not only for commercial airline pilots but also corporate and private pilots.

There are a number of current sources of flight weather information, a main one being the Federal Aviation Administration (FAA). The FAA, in conjunction with the National Weather Service (NWS), operates an aviation weather information system (FAA/NWS Teletypewriter Service A) from which aviators can get current flight data by telephoning FAA flight service stations. However, such a system of dissemination is quite cumbersome in that telephones are often busy, attendants are often too busy to spend sufficient time with aviators to properly service them, information is often improperly communicated orally over the telephone and it is time consuming. This system is also rather labor-intensive. Because of these deficiencies, it is an object of this invention to avoid oral telephonic communication of weather information and to provide an automated system for disseminating weather information.

Because of the inadequacies of the FAA/NWS system mentioned above, most airlines operate their own meterological departments and corporate aircraft operators generally subscribe to independent weather services. Without regard to the merit of these services, most general aviation pilots of noncorporate aircraft cannot afford these services, and therefore must still resort to telephoning, or visiting FAA flight service stations as is mentioned above. Because of the shortcomings of the FAA/NWS system, as described above, some general aviation pilots tend to rely on commercial television weather broadcasts, which of course are not specific enough for aviators' needs. Because of this, it is an object of this invention to provide a system and method of disseminating aviation weather information to general aviation, as well as other, pilots which is sufficiently convenient and inexpensive that general aviation pilots will use the system and therefore will obtain needed, updated, specific weather information prior to taking off on flights.

Airline meteorological departments tend to concentrate on particular scheduled routes of their respective airlines, to the exclusion of other areas, and would not generally have sufficient flexibility to serve general aviation pilots for unscheduled flights, or, for that matter, airline flights when schedules are changed. To overcome this, it is an object of this invention to provide an aviation weather dissemination system having sufficient flexibility that it can quickly provide accurate, and specific weather information for particular flight paths even though the flight paths are new, and not often traveled.

The independent weather services are more flexible in providing information than are the corporate meterological departments, however, even these services do not quickly provide particular weather information, tailor-made for unscheduled flights. These services will generally provide printouts from a data terminal which consist of: (1) current weather observations from a few selected airports; (2) details of severe weather; (3) terminal forecasts; (4) area forecasts; (5) Notice to Airmen (NOTAMS), which is used for special events, such as rocket firings or other activities that require that planes stay out of a particular air space; (6) Significant Meterological Event (SIGMETS), which is a report on very severe weather; (7) Announcement of Meterological Event (AIRMETS), which is also a report on bad weather, but less severe than SIGMETS; (8) winds aloft forecasts; (9) Pilot Reports (PIREPS), which are reports from other pilots; (10) radar reports; (11) weather warnings; and (12) digitized radar maps. However, these services do not provide quick, tailor-made weather information for particular nonscheduled flights. Thus, it is an object of this invention to provide a weather-information compilation and dissemination system which provides quick, accurate, and tailor-made weather forecasts for unscheduled flight paths as well as scheduled flight paths.

Another difficulty with existing national independent weather services is that often one must own a terminal before one can use these services, with the terminals currently costing in the neighborhood of $15,000 to $20,000 each. To avoid this, it is an object of this invention to provide a weather-dissemination system which allows general aviation pilots to obtain weather information without having to buy expensive terminals.

Yet another problem with prior-art weather dissemination systems is that they do not allow accurate dissemination of weather information to airborne crews. In this regard, weather has customarily been sent to airborne crews verbally and such a method has all the shortcomings described above for the FAA/NWS system. To overcome this, of late, aircrafts have often utilized CRT radar scan receivers inside aircraft so that the crews can see radar scans of their immediate areas. Such systems are relatively expensive, and therefore not often used by general aviation pilots. Also, such systems provide only information concerning the immediate areas of aircraft, which is rather limiting. Because of these shortcomings of prior-art systems, it is another object of this invention to provide a weather-information dissemination system which airborne aircraft crews can "plug into" for obtaining visual weather information concerning not only their immediate position, but also their entire flight path, and other areas if desired.

SUMMARY OF THE INVENTION

According to principles of this invention, a weather-information accumulating station collects, arranges and provides over normal telephone lines, tailormade weather information concerning both scheduled and unscheduled flight paths in response to inquiries made at terminals. The accumulating, or regional, station accomplishes this by automatically computing a tentative straight-line flight path between origin and destination airports (which information is received from the terminals) and then accumulating, and sequencing weather information for geographic points along the tentative flight path and arranging this information in a sequence relative to the origin and destination locations. This system accomplishes its method by employing pay-per-use terminals in airports, with a number of terminals being serviced by single regional stations, there being a plurality of regional stations in a larger geographic area. The regional stations communicate with some weather information sources via normal telephone channels and provide radar scans to the terminals.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 8 is a flowchart of the operation of the terminal station of FIG. 2; and

FIG. 9 is a flowchart of the operation of the regional station of FIG. 2.

DESCRIPTION OF A PREFERRED EMBODIMENT

Broad System

Figure 1:
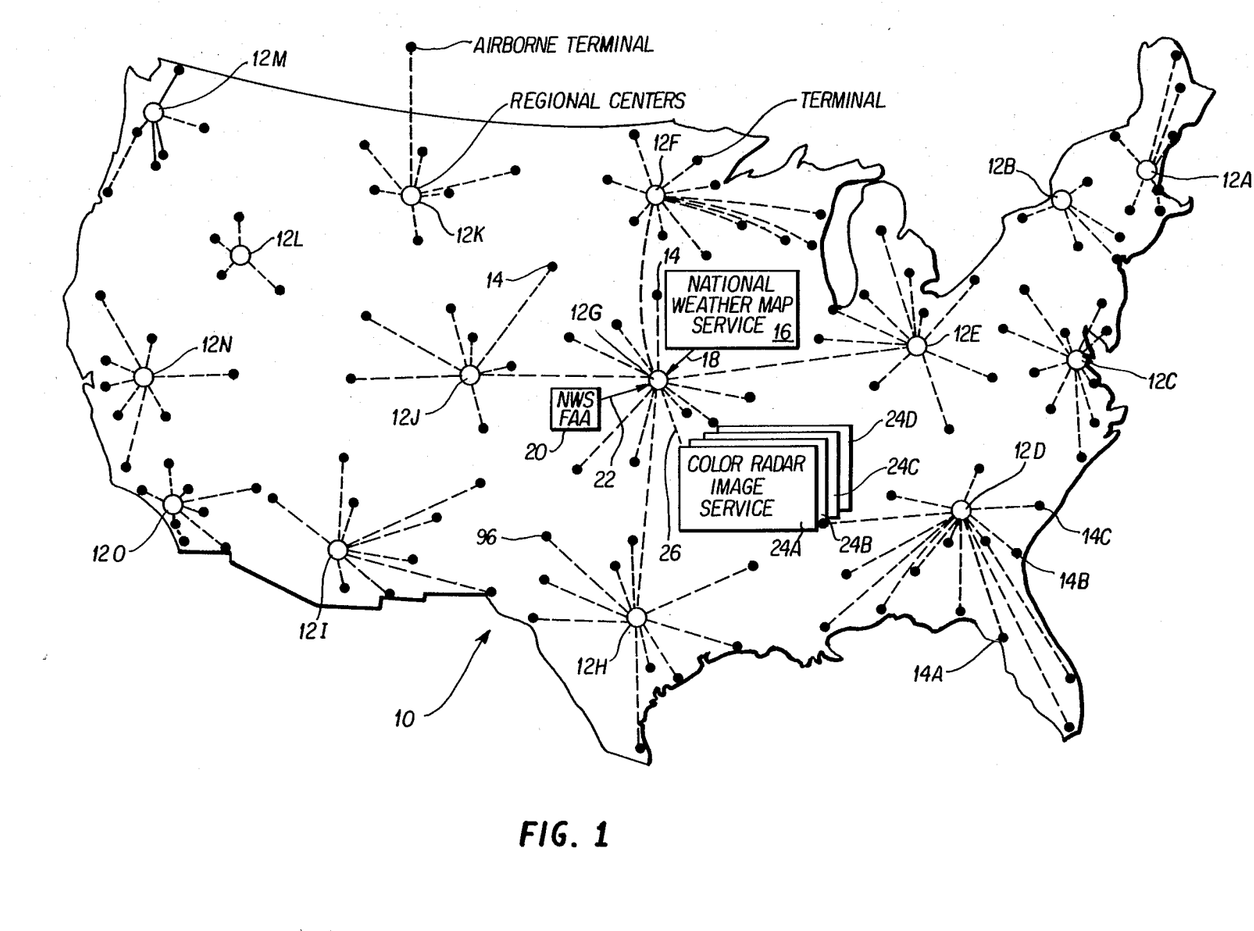
FIG. 1 is a diagramatic view of the United States having a system of this invention installed thereon.

FIG. 1 depicts a map of a geographic area 10, namely, the United States, having installed thereon an aviation weather communication system of this invention. In the depicted embodiment, the system includes 15 regional weather-information accumulating stations 12A-O. Each of these regional weather-information accumulating stations 12A-O serves a plurality of terminals 14, represented by black dots on the map. The dashed lines on the map indicate telephone communication links between the regional weather-information accumulation stations and their respective terminals. These telephone communication links are closed on a "per call" basis. Also drawn on the map are dashed lines between some of the regional stations, indicating that the regional stations also communicate with one another via "per call" telephone connections.

Each of the regional weather-information accumulating stations 12A-O communicates with a number of weather-information sources, with these sources being shown in FIG. 1 for only one regional station 12G. In the preferred embodiment, one of these sources is an independently operated television weather channel which provides a national weather-map service 16. A communication link 18 between the national weather-map service 16 and the regional office 12G includes a satellite receiving terminal (not shown) at the regional station 12G. There are several national weather-map services which provide continuously updated national weather maps of the type that are currently used on television weather forecast programs.

Further, the regional station obtains weather information from the National Weather Service/Federal Aviation Administration (NWS/FAA) teletypewriter service A 20 by means of a so-called "Bell System Weather Circuit" 22. The NWS/FAA teletypewriter service A 20 provides weather messages from the nearest FAA flight service station and includes messages from various other flight service stations throughout the United States.

The regional station 12G also receives weather information from a plurality of radar image services 24A-D which it separately telephones over normal telephone connections 26. There are currently at least four color radar image services 24A-D supplying radar images from various weather radar stations throughout the U.S. However, no single company provides complete nationwide coverage, therefore, it is necessary to access a plurality of these stations, and the flexibility of the phone system 26 allows all of these services to be easily accessed from any of the regional stations 12.

Broadly, a crewman at a terminal 14 actuates a keyboard to inform its regional center 12 of a flight's departure and destination points, and the regional center 12 provides tailor-made weather information to the crewman at the terminal and aids him in preparing a flight plan.

Terminal

Figure 2:
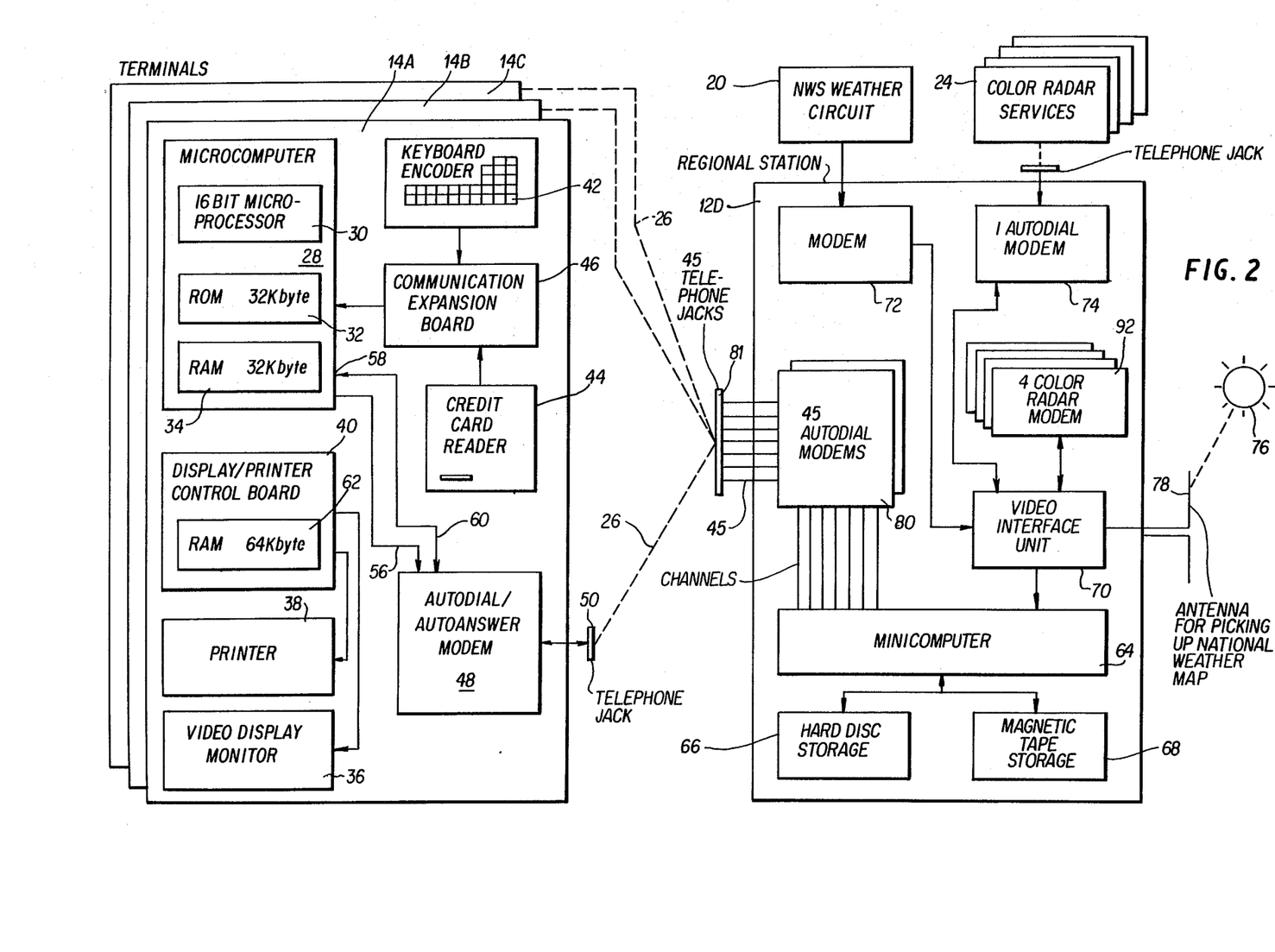
FIG. 2 is a block diagram of terminals and a regional station for the system of this invention.

FIG. 2 depicts a plurality of terminals 14A-C which are serviced by a single regional station 12D, however, it should be understood that these elements are identical for other terminals and stations depicted on the map of FIG. 1. Only one terminal will be described in detail, it being understood that the others are identical. The "brain" of the terminal 14A is a microcomputer 28 which includes a 16 bit microprocessor 30, a 32k byte read only memory (ROM) 32 and a 32k byte random access memory (RAM) 34. The microcomputer 28 controls a video display monitor 36 and a printer 38 via a display/printer control board 40 to communicate weather information to a crew member at the terminal 14A. The microcomputer 28 receives its instructions and credit card information from a keyboard encoder 42 and a credit card reader 44 via a communication expansion board 46. The microcomputer 28 receives weather information from the regional station 12D via normal telephone connections 26 through an auto-dial/auto-answer modem 48 at a telephone jack 50.

Figure 3:
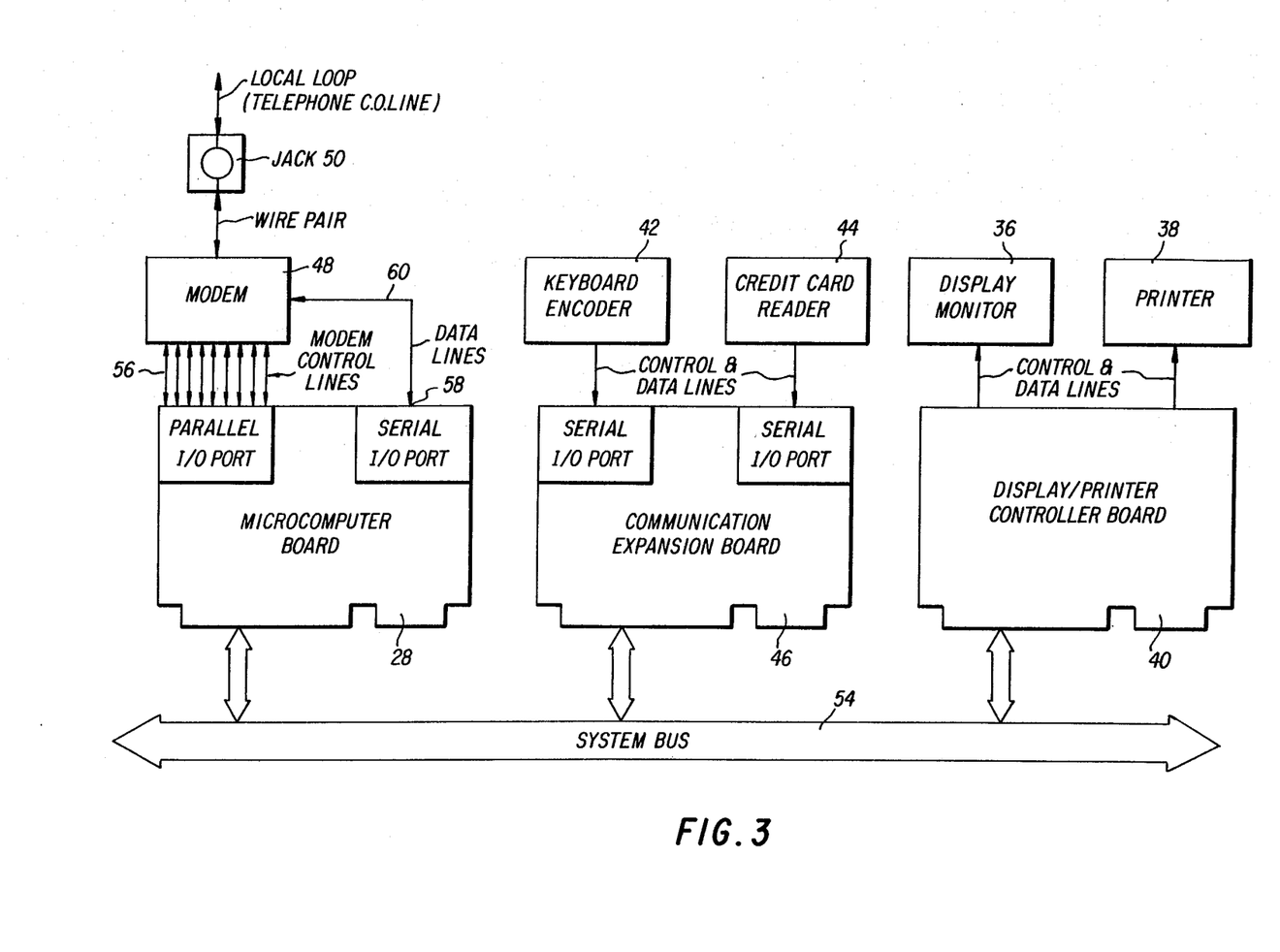
FIG. 3 is a block diagram of a subsystem of the FIG. 2 structure.

A control program for the microcomputer 28 is "burned" into the ROM 32 before it is installed on sockets on a microcomputer board 28, see FIG. 3. FIG. 3 is another-form block diagram depicting the same elements as FIG. 2, with like reference numerals identifying the same elements. The various elements are shown in FIG. 3 as being connected together by a system bus 54. In any event, returning to the microcomputer 28, the control program which is burned into the 32k byte ROM 32 resides in 8k to 12k bytes of the ROM, with the remaining ROM capacity containing a standby display, a service menu, instruction prompts, and city directories, all of which will be explained in more detail below. The microcomputer 28 has 24 programmable, parallel, input/output lines 56 (FIG. 3) to the modem 48 which serve as modem control leads. However, digital data to and from the modem utilizes a serial I/O port 58, on line 60.

The communication expansion board 46 provides additional serial I/O ports for the microcomputer 28, with one of the ports being used for the keyboard encoder 42 and the other for the credit card reader 24.

The display/printer control board 40 controls a video display on display monitor 36 and printing with the printer 38. This is, the display/printer control board 40 "bit-maps" each video frame in an on-board 64K byte random access memory (RAM) 62, and when a complete frame has been thusly mapped, sends this frame either to the video display monitor 36, or to the printer 38, depending on the mode in which the system is operating. This display/printer control board 40 produces a 256×240 pixel color display. Three, blanked, video data outputs (red, green, and blue), as well as a synchronization signal, are produced by the display/printer control board 40. The system does not employ two-field interlacing signals, as does a normal television signal, but rather the frame rate is made the same as a field rate of 60 repetitions per second. The video display monitor 36 is a standard red-green-blue unit such as a CRT or other state-of-the-art unit.

The system bus 54 (FIG. 3) provides inter connections between the microcomputer 28, the communication expansion board 46 and the display/printer control board 40. In the preferred embodiment, the bus is made integral with a card cage (not shown), with the card cage providing rigid mounting for the various boards, as well as the interconnections.

A power supply (not shown) provides signals of ±5 volts and ±12 volts with sufficient current to power all three boards. The power supply operates on commercial 110 V AC power.

The modem 48 accepts supervisory signals from the microcomputer 28 on lines 56 and generates proper dialing tones to call the regional center 12D associated with the terminal. When a telephone connection has been established, digital data is sent over these normal telephone channels at a rate of 2,400 bauds.

In a preferred embodiment, the microcomputer 28 is an iSBC 86/12A Single-Board Computer manufactured by the Intel Corporation of Santa Clara, Calif. The communication expansion board 46 is an Intel iSBC 534 4-Channel Communication Expansion Board. The display/printer control board 40 is a VR111 Alpha/-Graphics Controller manufactured by the Datacube Corporation of Reading, Maine. The system bus 54, and card cage (not shown), are each part of an iSBC 604 Modular Cardcage/Backplane manufactured by the Intel Corporation. The modem 48 is an R24 DC 2400 BPS Direct Connect Modem manufactured by the Rockwell International Corporation of Anaheim, Calif.

The keyboard with an integral encoder 42 is an R542 Numerical Keyboard manufactured by the Keytronic Corporation of Spokane, Wash. The credit card reader 44 is a Panasonic ZU100-VR manufactured by the Panasonic Corporation of Secaucus, N.J. The display monitor 36 is an RGB Monitor manufactured by Hitachi America, Ltd. of San Francisco, Calif.

Regional Station

The regional station 12D (FIGS. 2 and 4), as well as other regional stations 12A–O, is controlled by a minicomputer 64 which is serviced by a hard-disk storage 66 and a magnetic tape storage 68. The minicomputer 64 receives weather information via a video interface unit 70 from three sources, namely: the NWS/FAA Teletypewriter Service A 20, via a modem 72; the color radar image services 24, via normal telephone channels and an auto-dial modem 74; and a weather-map distribution satellite 76 via a dish antenna 78. As has already been discussed above, the NWS weather circuit 20 provides weather messages particular to weather stations located throughout the United States 10, the color radar services 24 provide radar scans for particular weather stations throughout the United States 10, and the satellite 76 provides a national weather map, all of which are current, operational, weather-information sources.

Figure 4:
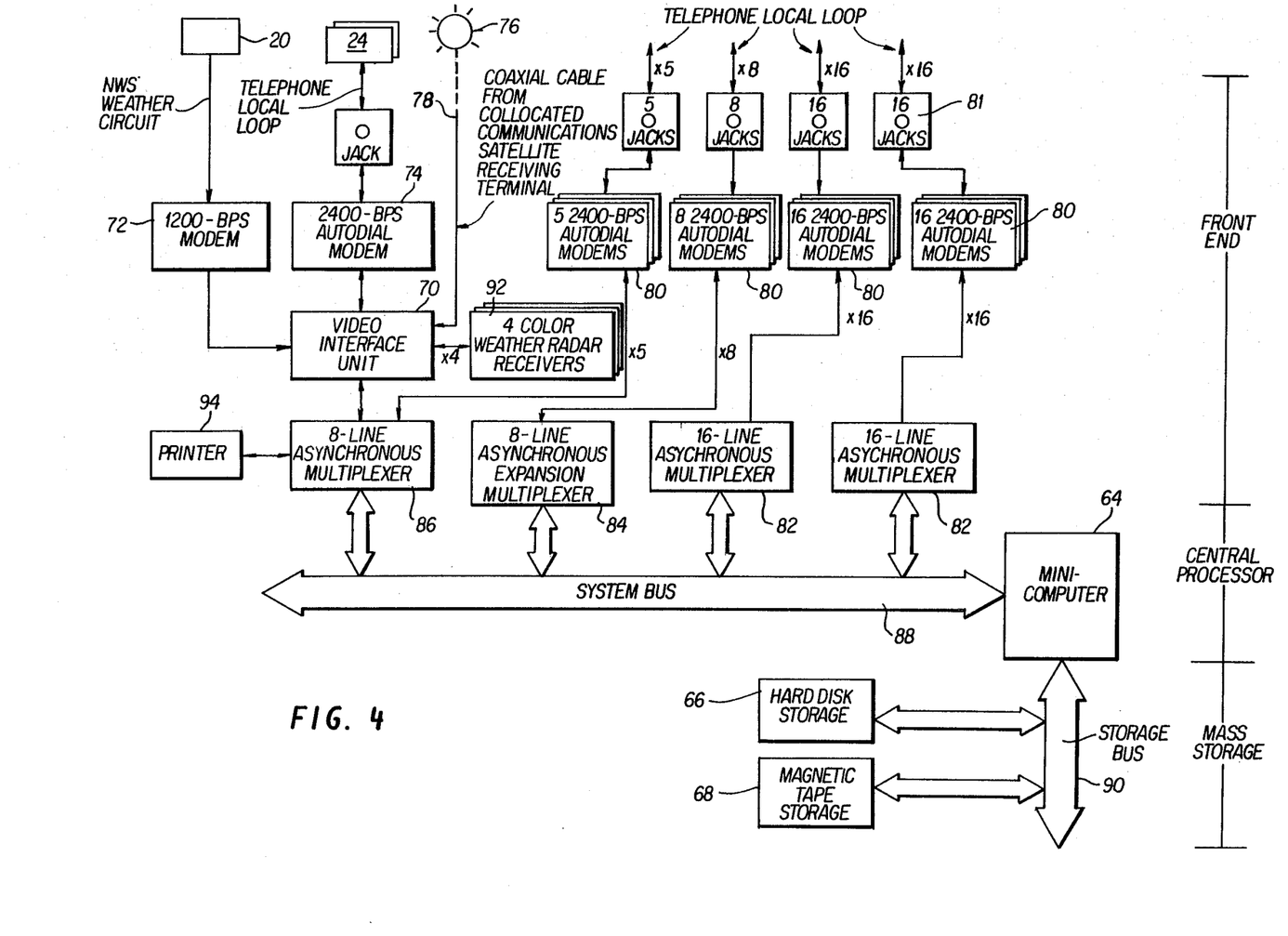
FIG. 4 is a block diagram of another subsystem of the FIG. 2 structure.

The minicomputer 64 disseminates weather information obtained from these sources via auto-dial modems 80 and conventional telephone channels 26 to the various terminals 14A–C.

The regional station 12D is shown in yet more detail in FIG. 4 wherein it can be seen that the minicomputer 64 is actually connected to the 45 auto-dial modems 80 via two 16-line asynchronous multiplexers 82, one 8-line asynchronous expansion multiplexer 84 and one 8-line asynchronous multiplexer 86 via a system bus 88. In this respect, the 8-line asynchronous multiplexer 86 only uses five lines to auto-dial modems for communicating with terminals 14, while the other three lines of the multiplexer 86 communicate with the sources of weather information 20, 24 and 76 via the video interface unit 70.

The minicomputer 64 is connected with the hard disk storage 66 and the magnetic tape storage 68 via a storage bus 90.

The minicomputer 64 has 1M bytes of metaloxide semiconductor memory while the hard disk storage 66 has a 67M byte capacity. The magnetic tape storage 68 forms a backup for the other storage systems, having a tape drive which operates at a speed of 45 inches/second and stores 1600 bits/inch.

Of course the multiplexers 82–86 provide the 48 time-division-multiplex I/O ports needed to communicate the various systems with the minicomputer 64.

The video interface unit 70 consists of a central processing unit (CPU) (not shown), an I/O board (not shown), and a color imaging system (not shown). The CPU controls operation of the unit. The I/O board provides two serial I/O's: one for a coaxial cable input from the antenna 78 and one for interconnection with the I/O port of the multiplexer 86. The video interface unit 70 also provides a parallel port for the auto-dial-/auto-answer modem 74 used for communicating with the color weather radar remoting services 24 via normal telephone channels. Further, the video interface unit 70 provides another parallel port for communicating with color weather radar receivers 92. In one embodiment, a high-speed dot matrix printer 94 (shown in FIG. 4, but not in FIG. 2), uses the remaining multiplexer I/O port.

A power supply (not shown) provides signals of ±5 volts and ±12 volts and operates from a commercial 110-VAC power supply.

The minicomputer 64, in a preferred embodiment, is a VAX-11/780 manufactured by the Digital Equipment Corporation of Maynard, Mass. The hard-disk storage drive 66 is a model REM 03 manufactured by the Digital Equipment Corporation while the magnetic tape storage transport 68 is a model TEE 16 manufactured by Digital Equipment Corporation. All multiplexers 82, 84 and 86 are manufactured by Digital Equipment Corporation and are models DZ 11-E, DZ 11-B, and DZ 11-A, respectively. Modems 80 are Rockwell R24 DC 2400 BPS Direct Connect Modems, manufactured by Rockwell International Corporation. Such a modem is also used as element 74. However, modem 72 which is used to interface FAA/NWS teletypewriter service A 20 transmissions is a T202T Modem manufactured by Rixon, Inc., of Silver Spring, Md. The printer 94 is a model LA 120-DA of Digital Equipment Corporation. The video interface unit 70, in the preferred embodiment is made up of the following equipment: a CB-2 Z80 Central Processing Unit, Model CPU-30300A manufactured by Jade Computer Products of Hawthorne, Calif.; an Input/Output Board, Model I/O-4-SSM, also manufactured by Jade Computer Products; a Color Imaging System, Model CAT 100, manufactured by Digital Video Systems of Palo Alto, Calif.; and an S-100 Bus, also manufactured by Digital Video Systems. The system buses 88 and 90 are manufactured by Digital Equipment Corporation for use with its VAX-11/780 Central Processing Unit and Peripherals. The color radar receivers 92 are provided by companies operating color weather radar remoting services, which currently include: Enterprise Electronics Corporation; Kavouras, Inc.; TSC Development Laboratories, Inc.; and Weathermation, Inc. The communications circuit 20 for connection with the local FAA flight service station is the Bell System Weather Circuit GD90488604, provided by the Bell System and its independent telephone companies throughout the U.S.

Operation

The system is set up by installing regional stations 12A-O throughout a geographic area, such as the United States, concentrating these stations according to population, as is shown in FIG. 1, for example. Terminals 14 are then installed in airports throughout the geographic area, as is depicted in FIG. 1, by simply taking the terminals 14 to the airports and plugging them into power supplies and telephone jacks. No new communication networks are necessary. The auto-dial-/auto-answer modems 48 (FIGS. 2 and 3) of the respective terminals are set to auto-dial, under instructions from their respective microcomputer 28, regional stations 12 closest to them so as to form clusters of terminals as is depicted in FIG. 1. By employing normal telephone channels, installation of terminals is thereby simplified.

Figure 5:
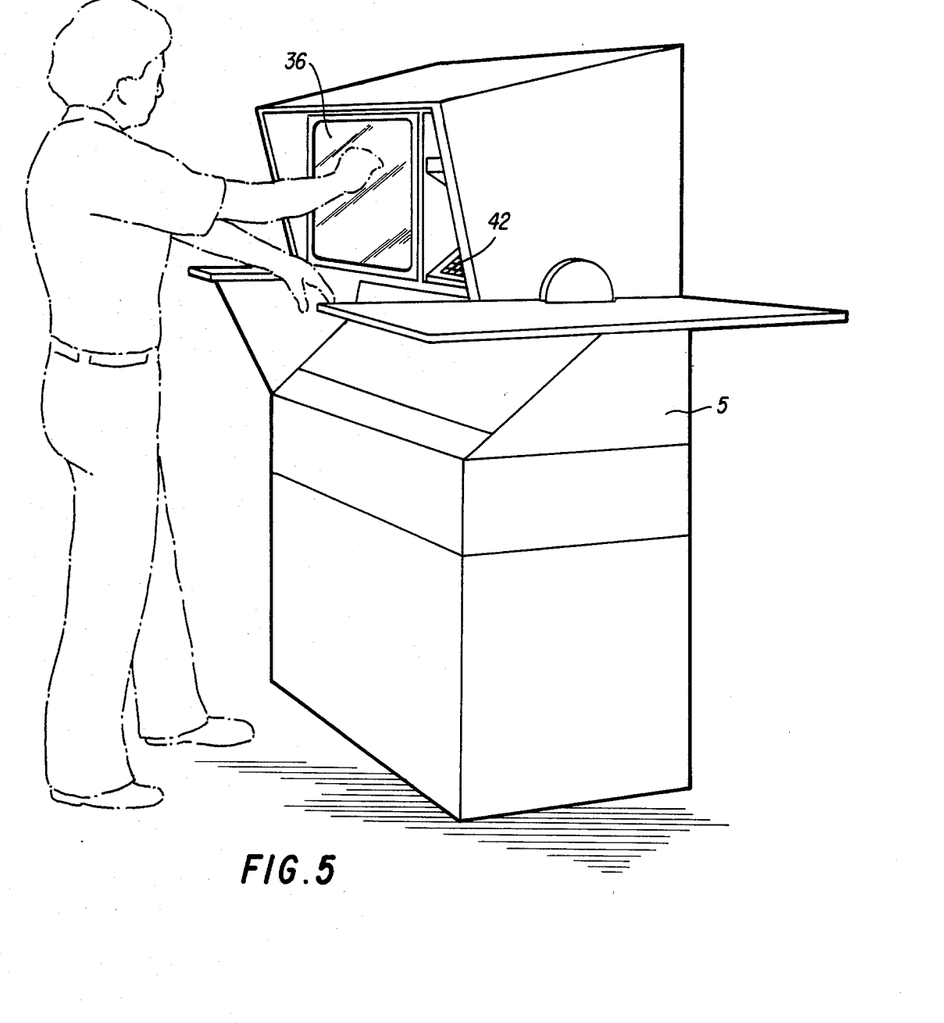
FIG. 5 is an isometric view of an aviator using a terminal of the FIG. 1 system.

To employ the system, a crew member of an aircraft, prior to takeoff, utilizes such a terminal 14. An external appearance of such a terminal is depicted in FIG. 5 in which the display monitor 36 and the keyboard encoder 42 can be seen. At this point in time, the terminal 14 is not connected with a regional station but its read only memory (FIG. 2) 32 provides a "standby" display (block 100 on the terminal flow chart of FIG. 8) on the display monitor 36 of information as to how to operate the terminal 14. For purposes of explanation, it will be assumed that the terminal 14A is in St. Petersburg, Fla. and a aviator crew member is planning a trip to Amarillo, Tex. 96 as is depicted on FIGS. 1 and 6.

Following standby instructions on the display monitor 36, the aviator, in order to use the terminal 14A, inserts a nationally-recognized credit card in the credit card reader 44 (FIG. 2) (which step is shown on the terminal flow chart of FIG. 8 at block 102) and, in response to signals therefrom, the microcomputer 28 instructs the modem 48 to dial up the Atlanta regional station 12D (FIGS. 1, 2 and 6) (see blocks 102 and 104 of the FIG. 8 terminal flow chart).

The modem 80 of the Atlanta regional station 12D auto-answers establishing a telephone link between the microcomputer 28 of the terminal 14A and the minicomputer 64 of the regional station 12D (blocks 106 and 108 of the regional flow chart of FIG. 9). The terminal 14A automatically transmits its identification to the regional center (block 110 of FIG. 8), thereby telling the regional center that the terminal 14A is located at the St. Petersburg Airport (block 112 of FIG. 9). In addition, the microcomputer 28 transmits credit card data (block 114 of FIG. 8). The minicomputer 64 of the regional station checks the credit card data against a negative credit card file which it retains in its harddisk storage 66 and, in the absence of negative credit information, the minicomputer 64 informs the microcomputer 28 to proceed with the transaction (blocks 116-124 of regional flow charts, FIG. 9, and blocks 126-132 of terminal flow chart, FIG. 8).

Figure 7A:
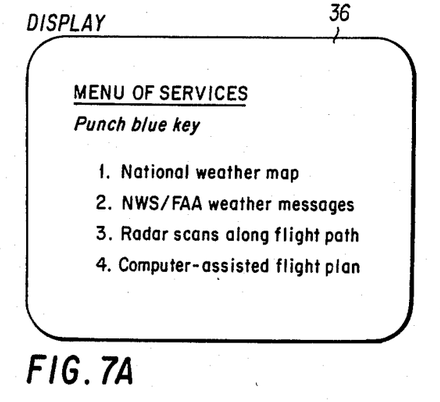
FIG. 7A is a diagramatic view of a display monitor at a terminal of this system showing a menu of services provided.
Figure 7B:
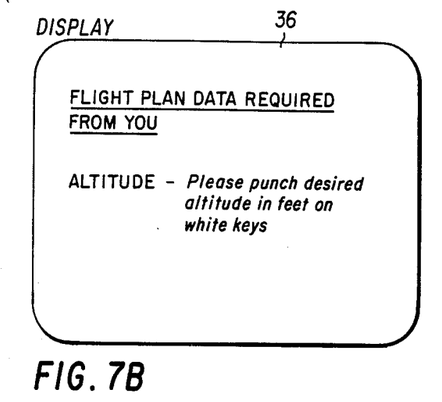
FIGS. 7B and 7C are a display monitor of FIG. 7A showing requests for flight data.
Figure 7C:
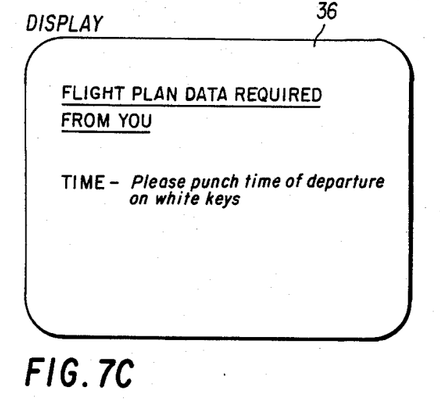

At this point, acting under a program in the ROM 32, the terminal displays a "menu of services" on the display monitor 36 (block 134 on terminal flow chart, FIG. 8), as is depicted in simplified form in FIG. 7A. As can be seen in FIG. 7A, the menu of services informs the crew member of the proper keys to punch if he wishes to view: (1) a current national weather map; (2) flight-path-sequenced NWS/FAA weather messages; (3) flight-path radar scans; and (4) a computer-assisted flight plan (crew member's selections are represented by blocks 136-150 of the terminal flow chart, FIG. 8). As will be described in more detail below, in the case that the crew member selects to receive a computer-assisted flight plan, using programmed information in the ROM 32, the microcomputer 28 instructs the crew member on the display monitor 36 to provide additional information pertaining to the flight as is depicted in simplified displays of FIGS. 7B and C (blocks 175 and 176 of terminal flow chart, FIG. 8). Again, the user keys in information required by the microcomputer 28 to prepare a flight plan, such as flight characteristics desired by the crew member and information necessary to meet FAA requirements.

While the crew member is making his selection of desired services, this information is being immediately transmitted to the regional station 12D (block 156, terminal flow chart of FIG. 8).

Immediately upon the minicomputer 64 learning that the crew member desires a national weather map (block 124 of regional flow chart, FIG. 9), without waiting to receive further information, and while the terminal 14A is receiving further instructions, the minicomputer 64 begins transmitting the current national weather map (blocks 158 and 160 of regional flow chart, FIG. 9) which it receives via the satellite 76 from a weather service and the information necessary for this image is recorded on the RAM 34 in the terminal 14A (blocks 162 and 164 on terminal flow chart, FIG. 9). Again, this is going on while the terminal 14A is receiving further information via the keyboard 42 from the user, with regard to a flight plan and destination city information (blocks 166–176 on the terminal chart, FIG. 9). The reason for beginning to transmit the weather map while instructions are still being given to the terminal 14A is that it takes from two to three minutes to transmit an image via telephone lines and it is desirable to get the most efficient use of various components of the system.

Figure 7D:
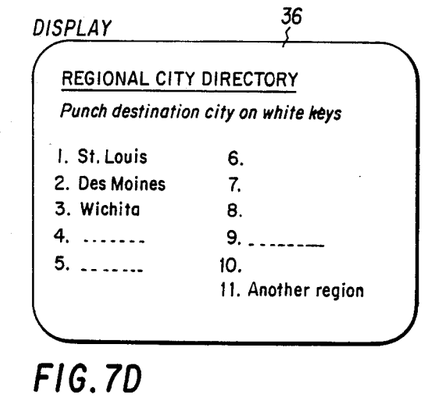
FIG. 7D is the display monitor of FIG. A showing a city directory.

For example, once the crew member has keyed into the keyboard 42 the sevices he desires (block 156 of terminal flow chart, FIG. 8), the microcomputer 28 interrogates him using a city directory in the ROM 32 as to his destination airport (block 168 of terminal flow chart, FIG. 8). In this regard, cities are displayed on the display monitor 36 along with codes for keying them into the system (a simplified example of such a display is shown in FIG. 7D), and the crew member, or user, collects the city nearest his destination airport for which he keys the codes into the keyboard encoder 42. Again this information is immediately transmitted to the regional center 12D (blocks 177–180 of terminal flow chart, FIG. 8, and block 182 of regional flow chart, FIG. 9) which now knows the departure and destination points of a flight proposed by the crew member. In another embodiment, the terminal 14A does not automatically transmit its location, but rather the crew member transmits the departure point to the regional station 12D.

Figure 6:
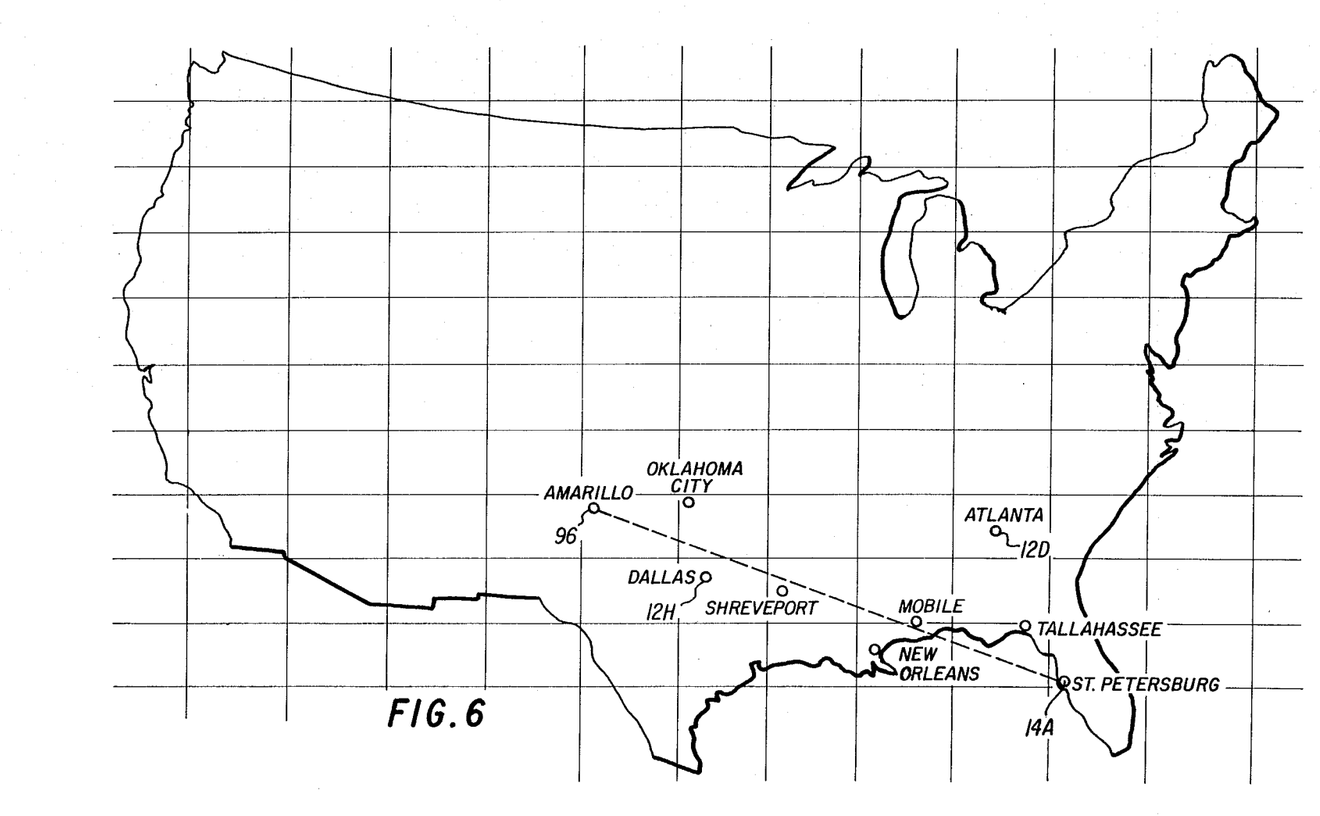
FIG. 6 is a diagramatic view of the United States illustrating a method employed by the system of this invention.

With reference to FIG. 6, the minicomputer 64 maintains a grid system in its storage 66 and 68 and also correlates the various cities for which FAA/NWS teletypewriter service A provides weather information with the grids into which they fall. The minicomputer 64, now knows the departure location to be St. Petersburg, Fla. and the arrival location to be Amarillo, Tex. Using this information, the minicomputer 64 computes a direct route between St. Petersburg and Amarillo and identifies those grid squares crossed by this route as is depicted in FIG. 6 (blocks 184, 186 and 188 of regional station flow chart, FIG. 9). The minicomputer 64 is programmed to identify all locations falling in those grid squares crossed by the route for which weather messages are provided by FAA/NWS teletypewriter service A and to then search its storage for all recent messages relating to those locations. The minicomputer 64 arranges those messages in sequence extending from the departure location to the arrival extending from the departure location to the arrival location. In the case described, the minicomputer 64 arranged these messages so that messages pertaining to St. Petersburg come first, Tallahassee second, Mobile third, New Orleans fourth, Shreveport fifth, Dallas sixth, Oklahoma City seventh, and Amarillo last (block 189 of regional flow chart, FIG. 9).

In the terminal 14A, as soon as the user has selected his destination city and the microcomputer 28 has sent this to the minicomputer 64, the microcomputer 28 addresses the national weather map image from the RAM 34 (which it just received from the regional station 12D) and places it on the display monitor 36 for the crew member to view (blocks 190 and 192 on the terminal flow chart, FIG. 8).

In the meantime, in the regional station 12D, the minicomputer 64 is ordering the auto-dial modem 74 to automatically dial the color radar service 24 which provides radar scans for the destination city, and is storing a display of this scan (blocks 194, 196 and 198 on the regional flow chart, FIG. 9).

Figure 7E:
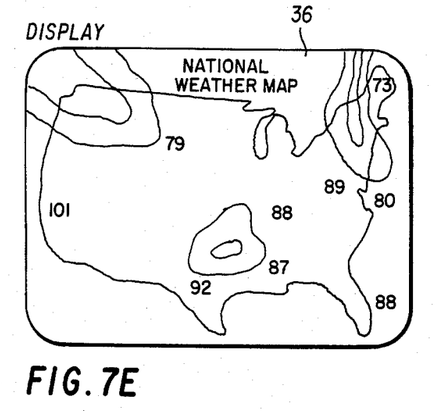
FIG. 7E is the display monitor of FIG. 7A showing a national weather map.
Figure 7F:
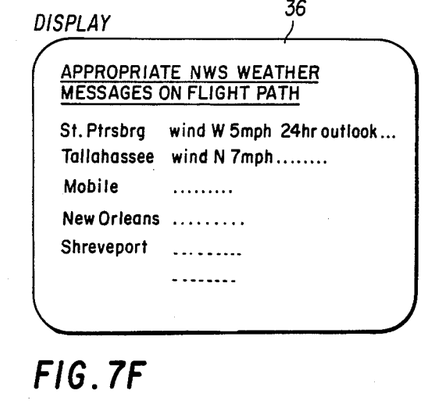
FIG. 7F is the display monitor of FIG. 7A showing flight-path weather messages.
Figure 7G:
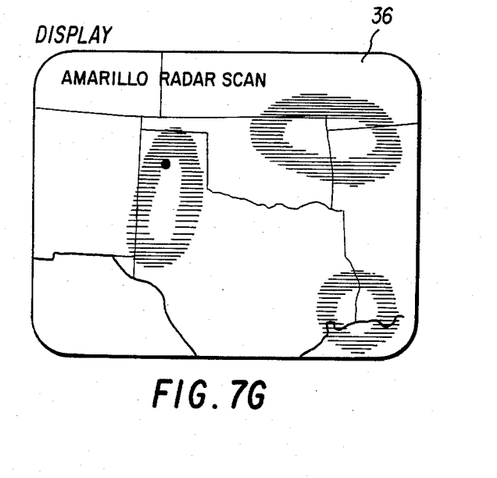
FIG. 7G is the display monitor of FIG. 7A showing a destination radar scan.
Figure 7H:
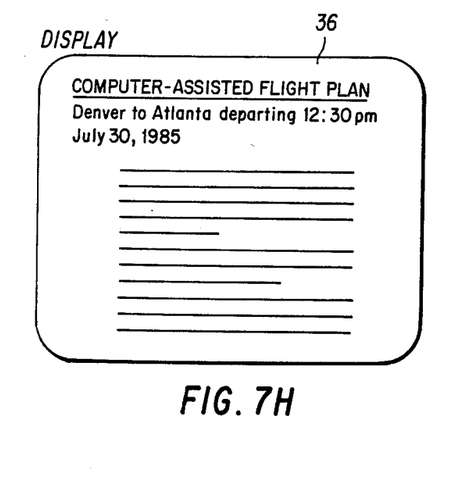
FIG. 7H is the display monitor of FIG. 7A showing a computer assisted flight plan.
Figure 7I:
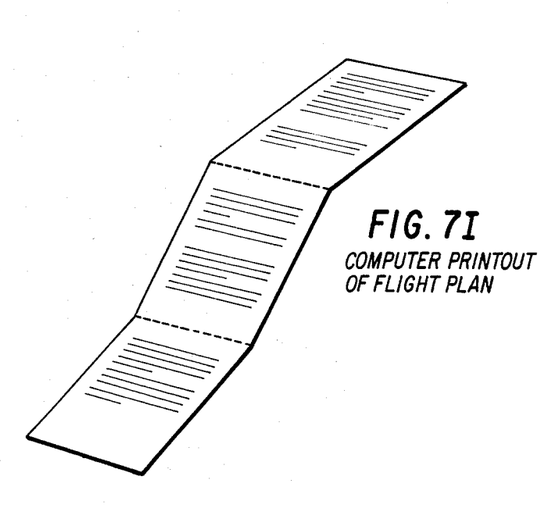
FIG. 7I is a computer printout of a flight plan.

While the national weather map is displayed, as is depicted in a simplified manner in FIG. 7E, on the display monitor 36, the minicomputer 64 is transmitting to the RAM memory of the terminal's microcomputer 28 sequentially arranged NWS weather messages on the flight path starting with those closest to the departure location and ending with those closest to the arrival location (block 189 of regional flow chart, FIG. 9, and blocks 200 and 202 of terminal flow chart, FIG. 8). Once the weather map has been fully viewed by the crew member, he so indicates by depressing the appropriate button and these sequenced weather messages are then displayed on the display monitor 36 as is depicted in a simplified manner in FIG. 7F (block 204 of terminal flow chart, FIG. 8). While these messages are being viewed, the radar scan for Amarillo, Tex. is being transmitted by the minicomputer 64 to the RAM of the terminal microcomputer 28 (blocks 206 and 208 of terminal flow chart, FIG. 8, and block 198 of regional flow chart, FIG. 9). Once the weather messages have been viewed, the user so indicates by depressing the appropriate button and thereafter the radar scan at Amarillo, as is depicted in FIG. 7G in a simplified manner, is shown on the display monitor 36 for his use (block 210 of terminal flow chart, FIG. 8).

In another embodiment, radar scans are provided from other locations along the flight path, and/or areas selected by the user.

Once all radar scans have been viewed, and assuming the user selected a computer-assisted flight plan, the regional station 12D computes a flight plan which includes alternate airports and transmits it to the terminal 14A for display next (blocks 212, 214 and 216 on regional flow chart, FIG. 9, and blocks 218 and 220 on terminal flow chart, FIG. 8).

During this entire operation, the user has the option of printing textual information with the printer 38 (blocks 222 and 224 of terminal flow chart, FIG. 8).

At the conclusion of the transaction, the regional station computes the charge for these various services and transmits it to the terminal for displaying and/or printing (block 226 of regional flow chart, FIG. 9, and block 228 of terminal flow chart, FIG. 8). The "charge" display terminates when the user retrieves his credit card from the slot (block 230 of terminal flow chart, FIG. 8). The display 36 then reverts to the standby information.

In one embodiment of this invention one of the regional stations 12 periodically telephones the other stations to consolidate billing information.

It will be understood by those skilled in the art that the weather-information system of this invention is relatively easy to install throughout a large geographical area, such as the United States, since terminals therefor can be connected to regional offices by existing telephone lines and since all parts are "off-the-shelf". Further, this system employs existing weather-information communication services, rather than requiring the creation of new communication services.

And even more importantly, this system provides more flexible, and specific weather information for particular flight paths, especially nonscheduled flight paths, than is currently available using existing weather services.

Yet another benefit of this systems is that it provides needed weather information to individual pilots who do not have the resources to subscribe to weather services or to purchase terminals.

Still another important benefit of this system is that it can be used by airborne crews who can "plug into" the system via air-to-ground telephones.

While this invention has been particularly shown and described with reference to a preferred embodiment, it will be understood by those skilled in the art that various changes in form and detail may be made therein without departing from the spirit and scope of the invention. For example, the minicomputer 64 could be programmed to locate weather messages close to a flight path without using the grid concept, as is described for this invention.

The embodiment of the invention in which an exclusive property or privilege are claimed are defined as follows:

1. An aviation weather communication system comprising:
   a plurality of terminals located at various geographic locations within a large geographic zone;
   a regional weather-information accumulating station for communicating with sources of current pictorial and written weather information peculiar to locations in said geographic zone and maintaining updated pictorial information and written weather messages cataloged according to the geographic locations to which the messages pertain;
   each of said terminals having an interconnected system comprising a logic circuit means, both RAM and ROM memories, a display means and an auto-dial modem coupling its terminal to an existing telephone network in said geographic zone;
   said regional station having an interconnected system comprising a logic circuit means, both RAM and ROM memories and modems coupling said regional station to said existing telephone network, for receiving and maintaining in said RAM memory a plurality of types of current weather information including pictorial and written-message weather information and for transmitting this information to said terminals upon request therefrom;
   each of said terminals further including an information input means for allowing a user to input into said terminal a request for said plurality of types of weather information, including pictorial and written-message weather information, along a flight path of an anticipated flight from an originating location to a destination location in said geographic zone, the logic circuit of said terminal including a communication-logic means for automatically placing a call over said existing telephone network via said terminal auto-dial modem and one of said modems at said regional station to said regional station and thereafter transmitting said request for pictorial and written-message weather information to said regional station in response to said user making such request at said terminal;
   said logic circuit of said regional station including a logic means for responding to a request for pictorial and written-message weather information along said flight path by transmitting some of said requested pictorial information which said terminal receives and stores in its RAM memory, said terminal logic circuit means having the function of utilizing the display means and information input means, simultaneously with said terminal receiving said some pictorial information, for further interrogating said user concerning said anticipated flight and thereafter communicating information received from this interrogation to said regional station, said regional station logic circuit having the further function of utilizing flight originating location and destination location information transmitted to it by said terminal to automatically compute a tentative flight path between said originating and destination locations, and thereafter to identify locations proximate said tentative flight path for which particular written weather messages are maintained at said regional station, and to communicate said weather messages to said terminal from which said request for weather information was received in a particular sequence of said flight path starting with said origin location and continuing to said destination location, said terminal logic circuit having the further function of displaying the weather messages with the display means in this sequence.

2. An aviation weather communications system as in claim 1 wherein said regional weather-information accumulating station includes a means for automatically telephoning a radar service which provides radar scans for obtaining a current radar scan at a destination and transmitting said radar scan to said terminal upon request therefor from said terminal.

3. An aviation weather communications system as in claims 1 or 2 wherein there are a plurality of regional weather-information accumulating stations in said large geographic zone, with each weather-information accumulating station servicing a plurality of terminals.

4. An aviation weather communication system as in claim 1 wherein said plurality of types of weather information which can be requested from said terminals includes, a national weather map, written weather messages at points along an anticipated flight path and a radar scan at a particular location along said tentative flight path.

5. A method for selective dissemination of aviation information from a regional center to an interested party at one of many terminals concerning an anticipated flight, said method comprising:
   maintaining at each of said terminals an interconnected system comprising a logic circuit means, both RAM and ROM memories, a display means and an auto-dial modem coupling its terminal to an existing telephone network;
   maintaining at said regional station an interconnected system comprising a logic circuit means, both RAM and ROM memories and modems coupling said regional station to said existing telephone network for receiving and maintaining a plurality of types of weather information including pictorial and written-message weather information;
   maintaining said regional station in communication with sources of current pictorial and written weather information peculiar to geographic locations and maintaining updated written weather messages in memory cataloged according to the geographic locations to which the messages pertain;
   receiving at one of said terminals from a user a request for a plurality of types of weather information, including pictorial and written-message weather information along a flight path of a flight from an originating location to a destination location;

automatically placing a call from said terminal to said regional station over said existing telephone network via said terminal-auto-dial modem, said existing telephone network and one of the modems at the regional station and thereafter transmitting said request for pictorial and written-message weather information to said regional station, in response to said user making such request at said terminal;

responding at said regional station to said request for said pictorial and written-message weather information along a flight path by transmitting some of the requested pictorial information which said terminal receives and stores in its RAM memory;

at said terminal, utilizing the display means and information input means to, simultaneously with said terminal receiving said some pictorial information, interrogate said user concerning his anticipated flight and to thereafter communicate the information derived from said interrogation to said regional station;

at said regional station, responding to reception of an originating location and a destination location by automatically computing a tentative flight path between said originating and destination locations, identifying locations proximate said tentative flight path for which particular written-weather messages are maintained at said regional station, pulling said weather messages out of its memory, and communicating said weather messages to said terminal from which said request for weather information was received in the particular sequence of said flight path, starting with said origin location and continuing to said destination location; and at said terminal, displaying the weather messages with the display means.

6. A method for selective dissemination of aviation information from a regional station to an interested party at one of many terminals as recited in claim 5 wherein said plurality of types of weather information include a large regional weather map, weather messages for weather along an anticipated flight path and a radar scan at a particular location related to said tentative flight path.

* * * * *